United States Patent
Wang et al.

(10) Patent No.: US 12,027,111 B2
(45) Date of Patent: Jul. 2, 2024

(54) DISPLAY PANEL AND CONTROL METHOD THEREOF

(71) Applicant: Wuhan China Star Optoelectronics Semiconductor Display Technology Co., Ltd., Hubei (CN)

(72) Inventors: Yedong Wang, Hubei (CN); Jia Zhang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/623,631

(22) PCT Filed: Dec. 17, 2021

(86) PCT No.: PCT/CN2021/139202
§ 371 (c)(1),
(2) Date: Jun. 15, 2023

(87) PCT Pub. No.: WO2023/103042
PCT Pub. Date: Jun. 15, 2023

(65) Prior Publication Data
US 2024/0096272 A1 Mar. 21, 2024

(30) Foreign Application Priority Data
Dec. 10, 2021 (CN) .......................... 202111504567.9

(51) Int. Cl.
G09G 5/10 (2006.01)
G09G 3/3208 (2016.01)
G09G 3/36 (2006.01)

(52) U.S. Cl.
CPC ......... *G09G 3/3208* (2013.01); *G09G 3/3607* (2013.01); *G09G 5/10* (2013.01); *G09G 2320/0626* (2013.01)

(58) Field of Classification Search
CPC ...... G09G 3/3208; G09G 3/3607; G09G 5/10; G09G 2320/0626
See application file for complete search history.

(56) References Cited

U.S. PATENT DOCUMENTS

2014/0184671 A1  7/2014  Lee

FOREIGN PATENT DOCUMENTS

| CN | 107452345 | 12/2017 |
| CN | 107909964 | 4/2018 |

(Continued)

OTHER PUBLICATIONS

Google translation of CN107452345 (Year: 2017).*
Google translation of CN111540331 (Year: 2020).*

*Primary Examiner* — Antonio Xavier

(57) ABSTRACT

A display panel and a control method thereof are provided. The control method comprises obtaining display information and compensation parameter information of the display panel, wherein the compensation parameter information includes multiple display parameter groups and multiple compensation parameter groups which are in one-to-one correspondence, and the display information is one of the display parameter groups; determining a target compensation parameter group corresponding to the display information from the compensation parameter groups according to the display information and the compensation parameter information; and compensating the light emitting brightness of the display panel according to the target compensation parameter group.

18 Claims, 5 Drawing Sheets

(56) References Cited

FOREIGN PATENT DOCUMENTS

| | | |
|---|---|---|
| CN | 111540331 | 8/2020 |
| CN | 111833794 | 10/2020 |
| CN | 113160768 | 7/2021 |

\* cited by examiner

DISPLAY PANEL AND CONTROL METHOD THEREOF

RELATED APPLICATIONS

This application is a National Phase of PCT Patent Application No. PCT/CN2021/139202 having International filing date of Dec. 17, 2021, which claims the benefit of priority of Chinese Patent Application No. 202111504567.9 filed on Dec. 10, 2021. The contents of the above applications are all incorporated by reference as if fully set forth herein in their entirety.

FIELD AND BACKGROUND OF THE INVENTION

The present application relates to the field of display technology, in particular to the manufacture of display devices, and specifically to a display panel and a control method thereof.

With the increasing demand for high-screen-to-body ratio products, the Camera under Panel (CUP) technology emerged.

Currently, among CUP products, due to a large difference between the two distances of the distance from the multiple sub-pixels in the under-screen camera area to the corresponding multiple pixel circuits and the distance from the multiple sub-pixels outside the under-screen camera area to the corresponding multiple pixel circuits, there is quite different between two electronical connections of the electrical connection length of the line from the sub-pixels in the under-screen camera area to the corresponding pixel circuit and the electrical connection length of the sub-pixels outside the under-screen camera area to the corresponding pixel circuit, so that there is a big difference between the two attenuation degrees of attenuation degree of the electrical signal transmitted to the multiple sub-pixels in the under-screen camera area and the attenuation degree of the electrical signal transmitted to the multiple sub-pixels outside the under-screen camera area; generally, optical compensation is used to improve the resulting uneven display of the picture.

However, in CUP products, compared with the comparative DC dimming mode, the unevenness of the picture display in the pulse width modulation (PWM) dimming mode under different brightness ranges is quite different, so that the current compensation parameters of optical compensation cannot be applied to both PWM dimming mode and DC dimming mode at the same time, and the uneven display of the picture still exists during switching between PWM dimming mode and DC dimming mode in CUP products.

Hence, it is necessary to improve that the current optical compensation method cannot be applied to both the PWM dimming mode and the DC dimming mode in CUP products.

The purpose of the present application is to provide a display panel and a control method thereof to solve the technical problem that the current optical compensation method cannot be applied to both the PWM dimming mode and the DC dimming mode in CUP products.

SUMMARY OF THE INVENTION

The present application provides a control method of a display panel, which comprises following steps: obtaining display information and compensation parameter information of the display panel, wherein the compensation parameter information includes multiple display parameter groups and multiple compensation parameter groups which are in one-to-one correspondence, and the display information is one of the display parameter groups; determining a target compensation parameter group corresponding to the display information from the compensation parameter groups according to the display information and the compensation parameter information; and compensating the light emitting brightness of the display panel according to the target compensation parameter group.

Wherein each of the display parameter groups comprises a first display parameter, and at least one display-mode parameter group comprises a second display parameter; wherein, the step of determining a target compensation parameter group corresponding to the display information from the compensation parameter groups according to the display information and the compensation parameter information further comprises: obtaining first display information and second display information of the display information, wherein the first display information is one of the first display parameters, and the second display information is one of at least one the second display parameter; determining at least one first-type display parameter group corresponding to the first display information from the display parameter groups according to the first display information and the first display parameters, wherein at least one the first-type display parameter group comprises the second display parameter; determining a target display parameter group corresponding to the second display information from at least one the first-type display parameter group according to the second display information and at least one the second display parameter; determining the target compensation parameter group corresponding to the target display parameter group from the compensation parameter groups according to the target display parameter group and the compensation parameter information; wherein the step of obtaining compensation parameter information of the display panel further comprises: obtaining a standard optical parameter of the standard display parameter group of the display panel and an adjusted optical parameter of each of the display parameter groups of the display panel, wherein the standard display parameter group is one of the display parameter groups; and determining corresponding compensation parameter groups according to differences between the standard optical parameter and each of the adjusted optical parameters, thereby forming the compensation parameter information from the display parameter groups and the compensation parameter groups.

In one embodiment, all or part of the first display parameters are dimming mode parameters, the first display information is a PWM dimming mode, and the second display parameter comprises at least one of a display frequency parameter or a display brightness parameter.

In one embodiment, the second display parameter comprises a display frequency parameter and a display brightness parameter, and the second display information comprises display frequency information and display brightness information; and wherein the step of determining a target display parameter group corresponding to the second display information from at least one the first-type display parameter group comprises: determining the target display parameter group corresponding to the second display information from at least one the first-type display parameter group according to the display frequency information, the display brightness information, the display frequency parameter of at least one the second display parameter, and the display brightness parameter of at least one the second display parameter.

In one embodiment, the display panel comprises a first display area and a second display area surrounding the first display area, and a sub-pixel in the first display area electrically connects to a pixel driving circuit in the second display area; wherein the step of obtaining display information of the display panel further comprises: obtaining display information of the first display area of the display panel; and wherein the step of compensating the light emitting brightness of the display panel according to the target compensation parameter group comprises: compensating the light emitting brightness of the first display area of the display panel according to the target compensation parameter group.

In one embodiment, the display panel comprises a first display area and a second display area surrounding the first display area, and a sub-pixel in the first display area electrically connects to a pixel driving circuit in the second display area; and wherein the step of obtaining a standard optical parameter of the standard display parameter group of the display panel and an adjusted optical parameter of each of the display parameter groups of the display panel further comprises: obtaining an optical parameter of the standard display parameter group of the second display area of the display panel as the standard optical parameter and an optical parameter of each of the display parameter groups of the first display area of the display panel as the adjusted optical parameter.

In one embodiment, each of the compensation parameter groups comprises multiple grayscale parameters and multiple compensation parameters which are in one-to-one correspondence; wherein the step of compensating the light emitting brightness of the display panel according to the target compensation parameter group comprises: obtaining grayscale information of sub-pixels of the display panel, wherein the grayscale information is one of grayscale parameters; determining the target compensation parameter corresponding to the grayscale information from the target compensation parameter group according to the grayscale information and the target compensation parameter group; and compensating the light emitting brightness of the sub-pixel according to the target compensation parameter.

The present application further provides a control method of a display panel, comprising: obtaining display information and compensation parameter information of the display panel, wherein the compensation parameter information includes multiple display parameter groups and multiple compensation parameter groups which are in one-to-one correspondence, and the display information is one of the display parameter groups; determining a target compensation parameter group corresponding to the display information from the compensation parameter groups according to the display information and the compensation parameter information; and compensating the light emitting brightness of the display panel according to the target compensation parameter group.

In one embodiment, each of the display parameter groups comprises a first display parameter, and at least one display-mode parameter group comprises a second display parameter; and wherein, the step of determining a target compensation parameter group corresponding to the display information from the compensation parameter groups according to the display information and the compensation parameter information further comprises: obtaining first display information and second display information of the display information, wherein the first display information is one of the first display parameters, and the second display information is one of at least one the second display parameter; determining at least one first-type display parameter group corresponding to the first display information from the display parameter groups according to the first display information and the first display parameters, wherein at least one the first-type display parameter group comprises the second display parameter; determining a target display parameter group corresponding to the second display information from at least one the first-type display parameter group according to the second display information and at least one the second display parameter; and determining the target compensation parameter group corresponding to the target display parameter group from the compensation parameter groups according to the target display parameter group and the compensation parameter information.

In one embodiment, all or part of the first display parameters are dimming mode parameters, the first display information is a PWM dimming mode, and the second display parameter comprises at least one of a display frequency parameter or a display brightness parameter.

In one embodiment, the second display parameter comprises a display frequency parameter and a display brightness parameter, and the second display information comprises display frequency information and display brightness information; and wherein the step of determining a target display parameter group corresponding to the second display information from at least one the first-type display parameter group comprises: determining the target display parameter group corresponding to the second display information from at least one the first-type display parameter group according to the display frequency information, the display brightness information, the display frequency parameter of at least one the second display parameter, and the display brightness parameter of at least one the second display parameter.

In one embodiment, the display panel comprises a first display area and a second display area surrounding the first display area, and a sub-pixel in the first display area electrically connects to a pixel driving circuit in the second display area; wherein the step of obtaining display information of the display panel further comprises: obtaining display information of the first display area of the display panel; and wherein the step of compensating the light emitting brightness of the display panel according to the target compensation parameter group comprises: compensating the light emitting brightness of the first display area of the display panel according to the target compensation parameter group.

In one embodiment, the step of obtaining compensation parameter information of the display panel further comprises: obtaining a standard optical parameter of the standard display parameter group of the display panel and an adjusted optical parameter of each of the display parameter groups of the display panel, wherein the standard display parameter group is one of the display parameter groups; and determining corresponding compensation parameter groups according to differences between the standard optical parameter and each of the adjusted optical parameters, thereby forming the compensation parameter information from the display parameter groups and the compensation parameter groups.

In one embodiment, the display panel comprises a first display area and a second display area surrounding the first display area, and a sub-pixel in the first display area electrically connects to a pixel driving circuit in the second display area; and wherein the step of obtaining a standard optical parameter of the standard display parameter group of the display panel and an adjusted optical parameter of each of the display parameter groups of the display panel further comprises: obtaining an optical parameter of the standard display parameter group of the second display area of the display panel as the standard optical parameter and an optical parameter of each of the display parameter groups of the first display area of the display panel as the adjusted optical parameter.

In one embodiment, each of the compensation parameter groups comprises multiple grayscale parameters and multiple compensation parameters which are in one-to-one correspondence; wherein the step of compensating the light emitting brightness of the display panel according to the target compensation parameter group comprises: obtaining grayscale information of sub-pixels of the display panel, wherein the grayscale information is one of grayscale parameters; determining the target compensation parameter corresponding to the grayscale information from the target compensation parameter group according to the grayscale information and the target compensation parameter group; and compensating the light emitting brightness of the sub-pixel according to the target compensation parameter.

The present application further provides a display panel, comprising: an obtaining module, configured to obtain display information and compensation parameter information of the display panel, wherein the compensation parameter information comprises multiple display parameter groups and multiple compensation parameter groups which are in one-to-one correspondence, and the display information is one of the display parameter groups; a processing module, configured to determine a target compensation parameter group corresponding to the display information from the compensation parameter groups according to the display information and the compensation parameter information; a compensation module, configured to compensate the light emitting brightness of the display panel according to the target compensation parameter group; and a storage module, configured to store the target compensation parameter group.

In one embodiment, each of the display parameter groups comprises a first display parameter, and at least one the display-mode parameter group comprises a second display parameter; wherein the processing module further comprises a sub-obtaining module, configured to obtain the first display information and the second display information of the display information, wherein the first display information is one of the first display parameters, and the second display information is one of at least one the second display parameter; a first sub-processing module, configured to determine at least one first-type display parameter group corresponding to the first display information from the display parameter groups according to the first display information and the first display parameters, wherein at least one the first-type display parameter group comprises the second display parameter; a second sub-processing module, configured to determine a target display parameter group corresponding to the second display information from at least one the first-type display parameter group according to the second display information and at least one the second display parameter; and a third sub-processing module, configured to determine the target compensation parameter group corresponding to the target display parameter group from the compensation parameter groups according to the target display parameter group and the compensation parameter information.

In one embodiment, the display panel comprises a first display area and a second display area surrounding the first display area, and a sub-pixel in the first display area electrically connects to a pixel driving circuit in the second display area; the obtaining module is configured to obtain the display information of the first display area of the display panel; and the compensation module is configured to compensate the light emitting brightness of the first display area according to the target compensation parameter group.

In one embodiment, the step of obtaining compensation parameter information of the display panel further comprises: obtaining a standard optical parameter of the standard display parameter group of the display panel and an adjusted optical parameter of each of the display parameter groups of the display panel, wherein the standard display parameter group is one of the display parameter groups; and determining corresponding compensation parameter groups according to differences between the standard optical parameter and each of the adjusted optical parameters, thereby forming the compensation parameter information from the display parameter groups and the compensation parameter groups.

In one embodiment, the display panel comprises a first display area and a second display area surrounding the first display area, and a sub-pixel in the first display area electrically connects to a pixel driving circuit in the second display area; and wherein the obtaining module is configured to obtain the optical parameters of the standard display parameter group of the second display area of the display panel as the standard optical parameters and configured to obtain the optical parameter of each the display parameter group of the first display area in the display panel as an adjusted optical parameter.

In one embodiment, each of the compensation parameter groups comprises multiple grayscale parameters and multiple compensation parameters which are in one-to-one correspondence; wherein the compensation module is configured to obtain grayscale information of the sub-pixels of the display panel, is configured to determine a target compensation parameter corresponding to the grayscale information from the target compensation parameter group according to the grayscale information and the target compensation parameter group; and is configured to compensate the light emitting brightness of the sub-pixel according to the target compensation parameter; and wherein the grayscale information is one of grayscale parameters.

The present application provides a display panel and a control method thereof. The control method comprises obtaining display information and compensation parameter information of the display panel, wherein the compensation parameter information includes multiple display parameter groups and multiple compensation parameter groups which are in one-to-one correspondence, and the display information is one of the display parameter groups; determining a target compensation parameter group corresponding to the display information from the compensation parameter groups according to the display information and the compensation parameter information; and compensating the light emitting brightness of the display panel according to the target compensation parameter group. Wherein, each display parameter group in the present application has a corresponding compensation parameter group, and the target compensation parameter group dynamically determines the compensation parameters according to the displayed information to compensate the light emitting brightness of the display panel, rather than a fixed compensation parameter group, so as to improve the reliability and accuracy of compensation and to reduce the uneven risk of the display screen.

BRIEF DESCRIPTION OF THE SEVERAL VIEWS OF THE DRAWINGS

The present application will be further explained below with reference to the drawings. It should be noted that the drawings in the following description are only used to explain some embodiments of the present application, so those skilled in the art can also obtain other drawings based on below drawings without creative work.

DESCRIPTION OF SPECIFIC EMBODIMENTS OF THE INVENTION

The technical solutions in the embodiments of the present application will be clearly and completely described below in conjunction with the accompanying drawings in the embodiments of the present application. Obviously, the described embodiments are only a part of the embodiments of the present application, rather than all the embodiments. Based on the embodiments of the present application, all other embodiments obtained by those skilled in the art without creative work shall fall within the protection scope of the present application.

In the description of the present application, the terms "first", "second", etc. are only used for descriptive purposes, and cannot be understood as indicating or implying relative importance or implicitly indicating the number of indicated technical features. Therefore, the features defined with "first" and "second" may explicitly or implicitly include one or more of the features. In the description of the present application, the "plurality" means two or more. Unless specifically defined otherwise, "electrically connected" means that the two are electrically connected, and it is not limited to direct or indirect connection.

In addition, it should be noted that the drawings provide only structures that are relatively closely related to the present application, and some details that are not related to the present application are omitted to simplify the drawings and make the main points of the invention clear at a glance, rather than to show that the actual device is exactly the same as the drawings, so it should not be regarded as a limitation of the actual device.

The present application provides a control method of a display panel, which includes but not limited to the following embodiments and a combination of the following embodiments.

Figure 1:
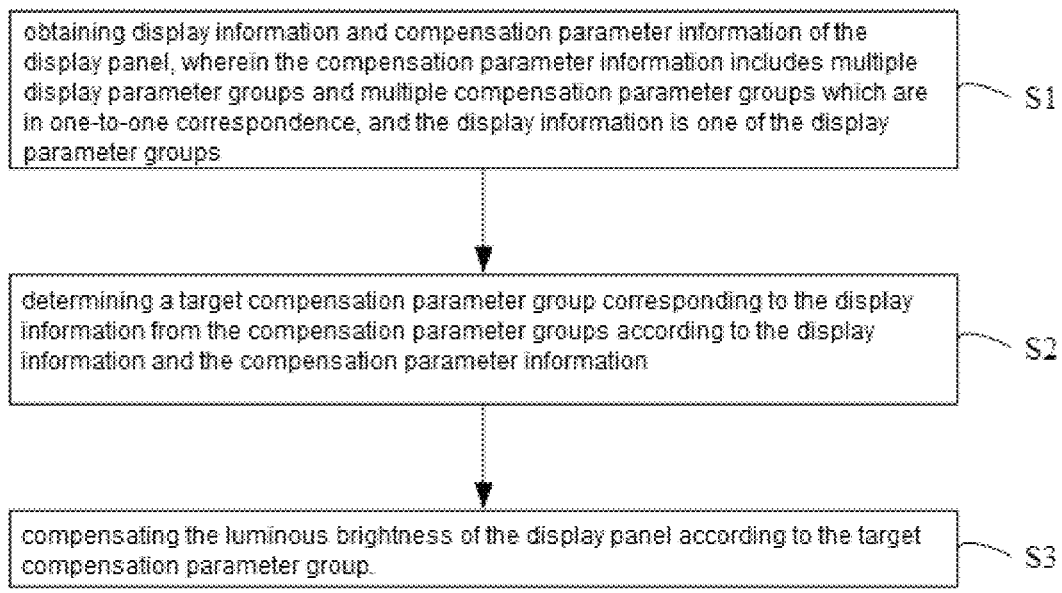
FIG. 1 is a flowchart of a first method for controlling a display panel provided by an embodiment of the present application.

In one embodiment, as shown in FIG. 1, the control method of the display panel includes but is not limited to the following steps.

The Step S1: obtaining display information and compensation parameter information of the display panel, wherein the compensation parameter information includes multiple display parameter groups and multiple compensation parameter groups which are in one-to-one correspondence, and the display information is one of the display parameter groups.

Specifically, the display panel may be an organic light-emitting diode (OLED) display panel or a liquid crystal display panel. Among them, the sub-pixels in the OLED display panel emit light under the drive of voltage or current through self-luminous devices. The light emitting brightness of a sub-pixel is related to the current or voltage flowing through the self-luminous device and the length of time the current or voltage acts on it. For example, in the DC dimming mode, to control the light emitting brightness of the sub-pixels, the current or voltage flowing through the self-luminous device is controlled in each frame, and the current or voltage in each frame is not zero. Another example is the pulse width modulation (PWM) dimming mode, which controls the duty cycle or duty ratio (the length of time) of the current or voltage flowing through the self-luminous device in each frame and keeps the current or voltage equal in each frame to control the brightness of the sub-pixels. Wherein, the sub-pixels in the liquid crystal display panel emit light through the liquid crystal layer through the light from the backlight; the light transmittance of the liquid crystal layer is related to the voltage applied to both ends of the liquid crystal layer; the light of the backlight is related to the current or voltage flowing through the backlight and is related to the duration of the current or voltage. For backlight sources in different areas, the amount of light in each frame can be adjusted through the DC area backlight dimming mode or the PWM area backlight dimming mode. For the principle of the DC area backlight dimming mode, please refer to the relevant description of the DC dimming mode above; for the principle of the PWM area backlight dimming mode, please refer to the relevant description of the PWM dimming mode above; so that the light emitting brightness of sub-pixels in a liquid crystal display panel is related to the voltage applied to both ends of the liquid crystal layer, the current or voltage flowing through the backlight, and the duration of the current or voltage.

Wherein, in the present application, the display panel is temporarily described as an OLED display panel as an example; the liquid crystal display panel can be combined with the above principles to refer to the control method of the display panel in the present application. It should be noted that, due to the difference in line length and individual device differences, the display brightness of sub-pixels in different areas of the display panel is different, therefore, it is necessary to compensate the brightness of at least one sub-pixel in the display panel through a set of compensation values to reduce the brightness difference among multiple sub-pixels. Furthermore, the self-luminous device in the OLED display panel needs a certain charging time to emit light; since the PWM dimming mode, compared with the DC dimming mode, involves the duty cycle of voltage or current (for example, in a frame with a low duty ratio at a high level, the longer time required to charge the self-luminous device, the greater risk of insufficient charging of the self-luminous device), there is a big difference between the light emitting brightness of the sub-pixels that need to be charged for a long time and the light emitting brightness of the sub-pixels that do not need to be charged for a long time (for example, the sub-pixels in the DC dimming mode), so that the one compensation-value set, mentioned above, cannot be applied to both the PWM dimming mode and the DC dimming mode.

It is understandable that the compensation parameter information in this embodiment includes multiple display parameter groups and multiple compensation parameter groups in one-to-one correspondence; that it, this embodiment arranges a corresponding compensation parameter group for each display parameter group, the display information is one of multiple display parameter groups, and at least one compensation parameter group corresponds to the display parameter group of the display panel. In combination with the above discussion, the display parameter group may be related to the dimming mode of the display panel or the dimming mode of the display backlight. It should be noted that the specific content of the display parameter group is not limited in this embodiment; this embodiment emphasizes that multiple compensation parameter groups, including but not limited to, can be implemented based on the difference between the dimming mode of the display panel and the dimming mode of the area backlight, rather than based on only a single compensation parameter group to compensate the light emitting brightness of the display panel.

The Step S2: determining a target compensation parameter group corresponding to the display information from the compensation parameter groups according to the display information and the compensation parameter information.

Specifically, in conjunction with the above discussion, the display information is one of the display parameter groups; that is, at first, determining the display parameter group that belongs to the same display information and then determining the compensation parameter group corresponding to the displayed parameter group as the target compensation parameter group. It should be understood that, in this embodiment, the corresponding compensation parameter group can be selected as the target compensation parameter group according to the displayed information; that is, the display panel, in the two states with different display information or in the two states corresponding to the two different display parameter groups in the compensation parameter information, could select two different compensation parameter groups, instead of setting the compensation parameter group to a single fixed display information.

For Step S3: compensating the light emitting brightness of the display panel according to the target compensation parameter group.

Specifically, combined with the above discussion, the compensation parameter information in this embodiment includes multiple display parameter groups and multiple compensation parameter groups; the display parameter groups and compensation parameter groups are in one-to-one correspondence; the display information is one of multiple display parameter groups; and the target compensation parameter group is a compensation parameter group selected according to the specific content of the displayed information. It is understandable that the target compensation parameter group in this embodiment is the compensation parameter group corresponding to the display information in the compensation parameter information; that is, the target compensation parameter group is dynamically determined for the specific content of the displayed information, rather than to compensate all the display information of the display panel by a fixed set of compensation parameters. Regarding the technical problem that a set of compensation values cannot be applied to the PWM dimming mode and the DC dimming mode at the same time, the PWM dimming mode and the DC dimming mode can be understood as two different display parameter groups in this embodiment; that is, in this embodiment, two corresponding compensation parameter groups are respectively set for the PWM dimming mode and the DC dimming mode to be respectively applied to the PWM dimming mode and the DC dimming mode, so as to reduce the uneven risk of the display picture.

Wherein, the display information can be the display information of the picture to be displayed in the display panel, that is, the target compensation parameter group of this embodiment can be used to compensate the display brightness of the picture to be displayed in the display panel, so as to improve the unevenness of the screen display through the technology of this embodiment when the screen is to be displayed; furthermore, the display information can also be the display information of the currently displayed screen in the display panel, that is, when the current display screen is displayed, so as to improve the unevenness of the screen display in time. Wherein, in combination with the above discussion, the target compensation parameter group could include the corresponding voltage value, current value, voltage duty cycle, or current duty cycle of the corresponding sub-pixel.

Figure 2:
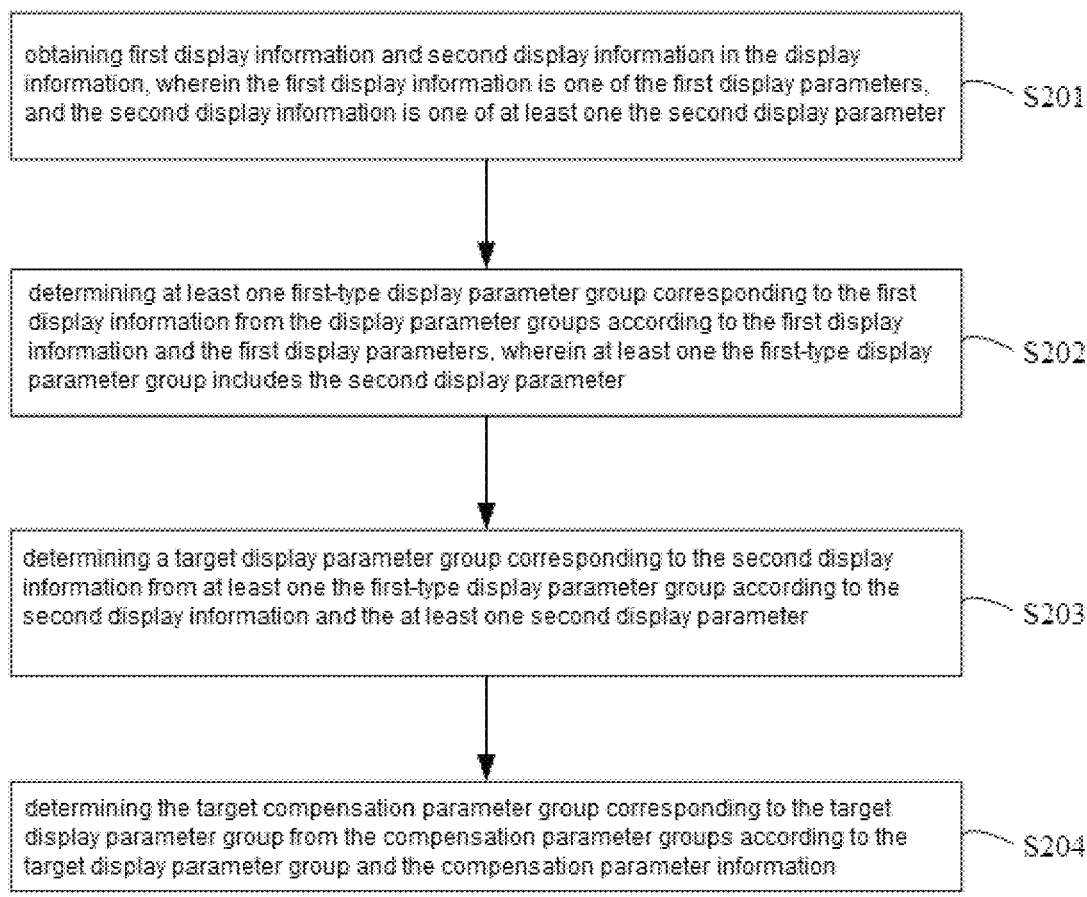
FIG. 2 is a flowchart of a second method for controlling a display panel according to an embodiment of the present application.

In one embodiment, as shown in FIG. 2, each of the display parameter groups includes a first display parameter, and at least one display mode parameter group further includes a second display parameter. Wherein, step S2 may include, but not limited, to the following steps; that is, the sequence of the following steps is not limited.

The Step S201: obtaining first display information and second display information in the display information, wherein the first display information is one of the first display parameters, and the second display information is one of at least one the second display parameter.

Specifically, according to the above discussion, each display parameter group includes at least the first display parameter, and part of the display parameter group may also include the second display parameter; correspondingly, the display information also includes at least the first display information, and the first display information is the same as one of first display parameters of the display parameter groups with one-to-one correspondence. Furthermore, according to the above discussion, on the basis that each display parameter group includes at least the first display parameter, the at least one display mode parameter group further includes a second display parameter; correspondingly, the at least one display information includes first display information and second display information, and the second display information is the same as one of the multiple second display parameters; the display information includes the first display information and the second display information as an example for below description.

The Step S202: determining at least one first-type display parameter group corresponding to the first display information from the display parameter groups according to the first display information and the first display parameters, wherein at least one the first-type display parameter group includes the second display parameter.

Specifically, according to the discussion above, in the compensation parameter information, the multiple display parameter groups and multiple compensation parameter groups are in one-to-one correspondence, and the first display information is one of the first display parameters; that is, all the display parameter groups with the same first display parameter and the first display information could be selected as the at least one first-type display parameter group; in other words, the common ground of the at least one first-type display parameter group is that the first display parameter in each first-type display parameter group is the same as the first display information. Furthermore, at least one display the first-type parameter group includes a second display parameter as an example for below description.

It should be noted that when the display information includes the first display information and the second display information, the first display information and the second display information could be obtained at the same time, and then at least one the first-type display parameter group corresponding to the first display information could be determined from the multiple display parameter groups, showed as the step S201 to step S202 as example. Of course, it is also possible to determine at least one the first-type display parameter group corresponding to the first display information from display parameter groups and then to obtain the second display information.

The Step S203: determining a target display parameter group corresponding to the second display information from at least one the first-type display parameter group according to the second display information and the at least one second display parameter.

Specifically, according to the above discussion, at least one the first-type display parameter group can be determined by step S202, and the at least one display-mode parameter group also includes a second display parameter; furthermore, in all the first-type display parameter groups, at least one second display parameter is the same as the second display information, that is, after step S202, at least one first-type display parameter group which second display parameter is the same as the second display information could be selected as the target display parameter group.

It should be noted that when at least one the first-type display parameter group includes a second display parameter, the first display information and the second display information can be obtained first, and then the first-type display parameter group and the target display parameter group can be obtained in turn, showed as the step S201 to step S203 as example; of course, it is also possible to determine at least one the first-type display parameter group corresponding to the first display information from display parameter groups, and then to obtain the second display information for determining the target display parameter group corresponding to the second display information.

Similarly, for multiple non-first-type display parameter groups, they can also be divided into at least the third-type display parameter groups according to the specific content of the corresponding first display parameters; furthermore, at least one the first-type display parameter group may also include a fourth display parameter; correspondingly, the display information may also include fourth display information that is the same as one of the fourth display parameters. Specifically, it is also possible to determine a partial display parameter group corresponding to the fourth display information from at least one the third type display parameter groups according to the fourth display information and at least one of the fourth display parameters; for details, reference showed as the relevant description from Step S202 to Step S203.

For Step S204: determining the target compensation parameter group corresponding to the target display parameter group from the compensation parameter groups according to the target display parameter group and the compensation parameter information.

Specifically, according to the above discussion, the first display parameter in the target display parameter group is the first display information, and the second display parameter in the target display parameter group is the second display information; that is, the target display parameter group is determined according to the two levels of screening of the first display information and the second display information; so that, after at least one the first-type display parameter group is determined, the target display parameter group is further determined according to the second display information; specifically determining a first-type display parameter group that is the same as the second display parameter group information is from at least one the first-type display parameter group with a second display parameter as the target display parameter group by comparing each second display parameter with the second display information; moreover, since each display parameter group has a corresponding compensation parameter group, the target compensation parameter group can also be determined as the compensation parameter group corresponding to the target display parameter group correspondingly.

It is understandable that in this embodiment, for the first-type display parameter group that conforms to the first display information, the second display information is further screened to determine the target compensation parameter group for compensating the light emitting brightness of the display panel; that is, the target compensation parameter group can focus on more accurate compensation for the display screen that also meets the second display information on the basis of the display screen that meets the first display information, so as to improve the accuracy of compensating the light emitting brightness of the display panel.

In an embodiment, the first display parameter includes a dimming mode parameter, all or part of the first display information is dimming mode parameters, the first display information is a PWM dimming mode, and the second display parameter includes at least one of a display frequency parameter or a display brightness parameter.

According to the above discussion, PWM dimming mode and DC dimming mode can be understood as two different display parameter groups; furthermore, in combination with step S201 to step S204, it is further defined here that all or part of the first display parameters include dimming mode parameters. Since the first display information is one of first display parameters, that is, the specific content of the first display information may be one of the dimming mode parameters; hence, the first display information is further defined as the PWM dimming mode.

In combination with the above discussion, because the PWM dimming mode involves the duty cycle of voltage or current, and the self-luminous device needs a certain charging time to emit light; that is, the proportion of self-luminous device charging in each frame is related to the length of time the corresponding high level is maintained, and the insufficient charging risk of the self-luminous device is related to the size of the charging proportion; therefore, the length of time that the high level is maintained in each frame of the PWM dimming mode leads to the risk of insufficient charging of the self-luminous device and determines the degree of uneven display of the picture. Hence, in conjunction with step S202 and step S203, the first display information is the PWM dimming mode parameter as an example for description, that is, all the first type of display parameter groups are applicable to the PWM dimming mode.

In combination with the above discussion, the duration of the high-level maintenance in each frame in the PWM dimming mode is related to the total duration of each frame and the high-level duty cycle. Wherein, the total time length of each frame is related to the frame frequency of the corresponding display screen; that is, the total time length of each frame is the reciprocal of the frame frequency of the corresponding display screen, and the high-level duty cycle is related to the brightness value of the corresponding display screen, so that the greater the brightness value of the display screen, the greater the required high-level duty cycle; and vice versa. Therefore, it can be understood that the brightness value of the display screen and the frame frequency of the display screen determine the uneven level of the display screen.

Figures 3, 4:
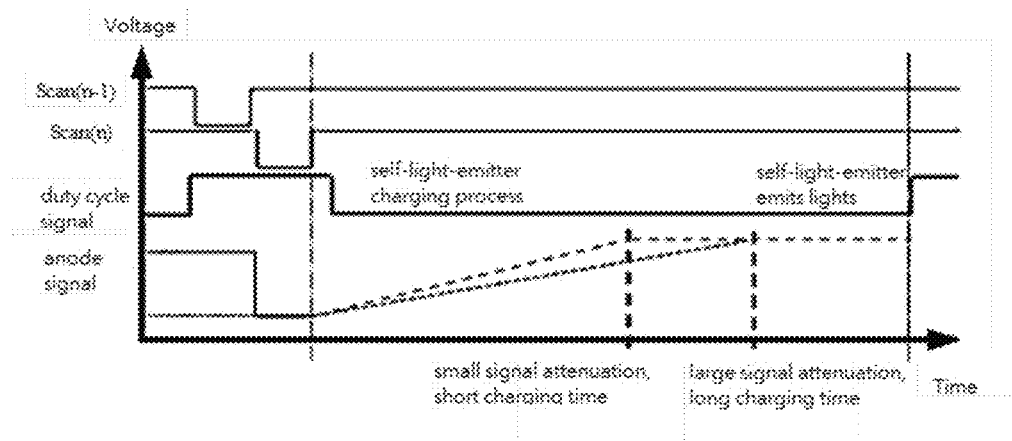
FIG. 3 is a schematic diagram of waveforms of some signals in the display panel.
FIG. 4 is a schematic diagram of the display screen of the display panel under different conditions.

Specifically, as shown in FIG. 3, the effective level of the scan signal Scan(n) of the current frame is after the effective level of the scan signal Scan(n−1) of the previous frame, and the effective level control of the scan signal Scan(n) of this frame and the corresponding transistor of the capacitance control are turned on. Furthermore, during the effective level of the duty cycle signal, the voltage of the anode signal gradually increases to charge the self-luminous device, until the voltage of the anode signal is stable, it means that the self-luminous device emits light after the charging is completed. It can be understood that the attenuation of the electrical signal transmitted to the anode is small, so the time required for the anode signal to reach a stable voltage is short, and the time required for charging the self-luminous device is also short; vice versa. In combination with the above discussion, the charging process of the self-luminous device occurs during the effective level of the duty cycle signal, in this frame, the larger the effective level of the duty cycle signal, the longer the effective level period of the duty cycle signal; that is, the smaller the proportion of the charging process of the self-luminous device, the lower the insufficient charging risk of the self-luminous device.

Wherein, each brightness value can correspond to multiple fixed grayscale values. In the same grayscale value, the voltage, current, high voltage duty ratio, or high current duty ratio required for a larger brightness value is larger; in the same brightness value, the voltage, current, high-voltage duty ratio, or high-current duty ratio required for a larger grayscale value is larger; so that both high voltage duty cycle and high current duty cycle can be understood as negatively correlated with the black insertion ratio. Specifically, as shown in FIG. 4, the frame frequencies of the display screens of the three images in the first row are the same, but the brightness values, grayscale values, and black insertion ratios of the three display screens are different; on the one hand, shown as FIG. 4, we can see that the larger the black insertion ratio, the more obvious unevenness of the picture; on the other hand, combined with the above discussion, the larger black insertion ratio, the shorter duration of high-level maintenance in each frame, the greater insufficient charging risk of the self-luminous device, and the more obvious the unevenness of the picture; the two conclusions are consistent. As shown in FIG. 4, the brightness values, grayscale values, and black insertion ratios of the display screens of the three images in the second row are all the same; on the one hand, showed as FIG. 4, it can be seen that the larger the frame frequency of the displayed picture, the more obvious unevenness of the picture; on the other hand, combined with the above discussion, the larger frame frequency of the display screen, the smaller total duration of each frame, the shorter duration of high level maintenance in each frame, and the greater insufficient charging risk of the self-luminous device, and the more obvious average phenomenon; the two conclusions are consistent.

Wherein, the display frequency parameter in this embodiment is the frame frequency of the display screen mentioned above; the display brightness parameter is the brightness value of the display screen mentioned above, that is, the second display parameter includes at least one of a dimming frequency parameter and a display brightness parameter; and it can be understood that the second display parameter includes a combination of a dimming frequency parameter and a display brightness parameter or one of the two. Specifically, the second display parameter is a display frequency parameter or a display brightness parameter, and the number of the second display parameter is 2 as an example for description here. For example, when the second display parameter is a dimming frequency parameter, it means that the specific content of the second display information may be one of the dimming frequency parameters. Each dimming frequency parameter can be a frequency range. The two second display parameters can use the two frequency ranges $(0,x]$ and $(x,+\infty)$ as the corresponding two dimming frequency parameters. The x can be obtained according to the actual situation but not limited to simulation. Moreover, for another example, when the second display parameter is a display brightness parameter, it means that the specific content of the second display information may be one of the display brightness parameters. Each display brightness parameter can be a brightness interval. The two second display parameters can use the two brightness intervals $(0,y]$ and $(y,+\infty)$ as the corresponding two display brightness parameters. In the same way, y can be obtained through but not limited to simulation according to the actual situation; y could be 200 nit.

In an embodiment, the second display parameter includes a display frequency parameter and a display brightness parameter, and the second display information includes display frequency information and display brightness information; wherein, the step S203 may include but is not limited to the following step S2031: determining a target display parameter group corresponding to the second display information from at least one first-type display parameter group according to the display frequency information, the display brightness information, the display frequency parameter in at least one of the second display parameters, and the display brightness parameter in at least one of the second display parameters.

Specifically, before step S2031 is performed, this step can be performed: determining at least one first-type display parameter group corresponding to the PWM dimming mode from the plurality of display parameter groups according to the PWM dimming mode and the dimming mode parameters; for this step, please refer to the relevant description of step S202 above; that is, the first display parameter is replaced with the dimming mode parameter, and the first display information is replaced with the PWM dimming mode for understanding.

Wherein, the format of the second display information and the second display parameter may be the same or different; for example, the second display information may sequentially include display frequency information and display brightness information, and the second display parameter may include a display frequency parameter and a display brightness parameter in turn. Wherein, the display frequency information may be the same as the display frequency parameter in at least one of the second display parameters, and the display brightness information may be the same as the display brightness parameter in at least one of the second display parameters. Further, if a the second display parameter which the display frequency parameter is the same as the display frequency information, and which display brightness parameter is the same as the display brightness information, it can be used as the target display parameter group.

It can be understood that the second display information in this embodiment includes display frequency information and display brightness information; that is, in step S2031, the two information of display frequency information and display brightness information can be considered at the same time. Combined with the above discussion, the brightness value of the display screen and the frame frequency of the display screen determine the degree of uneven display of the screen; that is, both the display frequency information and the display brightness information can determine the degree of uneven display of the screen. Therefore, the target compensation parameter set in this embodiment is based on performing accurate compensation for the display screen that conforms to the first display information and the second display information, so as to enrich the information volume of the second display information, to compensate the display screen accurately according to the comprehensive consideration of multiple dimensions, and to improve the compensation accuracy of the light emitting brightness of the display panel.

In an embodiment, the display panel includes a first display area and a second display area surrounding the first display area, and a sub-pixel in the first display area electrically connect to a pixel driving circuit in the second display area. Wherein, the step of obtaining display information of the display panel includes obtaining the display information of the first display area in the display panel; and the step of compensating the light emitting brightness of the display panel according to the target compensation parameter group includes compensating the light emitting brightness of the first display area according to the target compensation parameter group.

Wherein, compared to the second display area, the first display area could be as a greater demand for light transmission; for example, the first display area may be provided with optical devices for photographing or touch recognition. Specifically, the pixel driving circuit that is electrically connected to and drives the sub-pixels of the first display area can be set in the second display area that has a small light transmission requirement. Therefore, there is a greater different in distance between the distance between the sub-pixels in the first display area to the corresponding plurality of pixel driving circuits and the distance between the sub-pixels in the second display area and the corresponding plurality of pixel driving circuits, and there is a greater different in attenuation between the attenuation of the electrical signals transmitted to the multiple sub-pixels in the first display area and the attenuation of the electrical signals transmitted to the multiple sub-pixels in the second display area, so as to cause uneven display of the screen; specifically, a ring screen will appear in the area near the junction of the first display area and the second display area.

It should be noted that this embodiment is based on the fact that the uneven display of the picture caused by other reasons has been improved by, but not limited to, the method including step S1 to step S3 for further improvement afterwards. Specifically, for the first display area that further causes uneven display of the screen, since the distribution of the first display area is fixed, the sub-pixels are more concentrated in the first display area. It should be understood that the difference in the degree of attenuation of the electrical signals transmitted to the multiple sub-pixels in the first display area and the second display area is greater than the degree of attenuation transmitted to the two sub-pixels for other reasons, so as to require the greater corresponding degree of optical compensation. Combined with the above discussion, because a set of compensation values cannot be applied to both the PWM dimming mode and the DC dimming mode, when compensating for the brightness of the first display area, the uneven display of the picture caused by the set of compensation values will be more serious. Furthermore, in this embodiment, the scenarios that the method from step S1 to step S3 is applied are further refined: the light emitting brightness of the first display area is compensated according to the target compensation parameter group by acquiring the display information of the first display area in the display panel, that is, the method of step S1 to step S3 is used to compensate the light emitting brightness of the first display area, which further improves the application value of the method for the uneven display of the screen.

Figure 5:
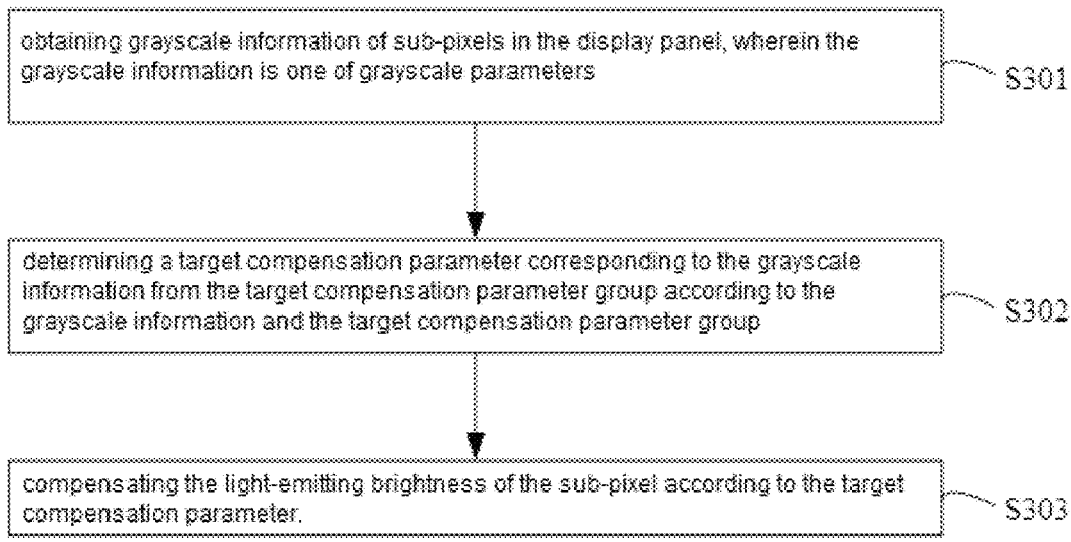
FIG. 5 is a flowchart of a third method for controlling a display panel provided by an embodiment of the present application.

In an embodiment, as shown in FIG. 5, each of the compensation parameter groups includes multiple grayscale parameters and multiple compensation parameters in one-to-one correspondence; wherein, step S3 may include but is not limited to the following steps.

For Step S301: obtaining grayscale information of sub-pixels in the display panel, wherein the grayscale information is one of grayscale parameters.

Among them, the grayscale information can be understood as the grayscale value that the corresponding sub-pixel should theoretically present. For example, the sub-pixels in the OLED display panel are driven by the voltage or current corresponding to the grayscale information through the self-luminous device to emit the grayscale value; for another example, the liquid crystal layer in the liquid crystal display panel exhibits a grayscale value that passes through the backlight under the action of a voltage corresponding to the grayscale information. Further, in conjunction with the relevant discussions above on the DC dimming mode and the PWM dimming mode, in different brightness ranges, the voltage value, current value, voltage duty cycle, or current duty cycle corresponding to each grayscale value, so that the sub-pixels present the corresponding grayscale value under the brightness.

Specifically, the value range of the grayscale information can be set according to the screen display requirements, and multiple gray-scale parameters can cover the value range of gray-scale information, so that, any grayscale value can be included in multiple grayscale parameters. It should be noted that multiple gray scale parameters in any compensation parameter group can be equal, and multiple compensation parameters in any compensation parameter group can also be equal.

For Step S302: determining a target compensation parameter corresponding to the grayscale information from the target compensation parameter group according to the grayscale information and the target compensation parameter group.

Specifically, according to the above discussion, the target compensation parameter group can be determined through step S2. Since each compensation parameter group includes multiple gray-scale parameters and multiple compensation parameters in one-to-one correspondence, that is, the target parameter group also includes multiple gray-scale parameters and multiple compensation parameters in one-to-one correspondence; also, since the grayscale information is one of multiple grayscale parameters, the compensation parameter corresponding to the grayscale parameter equivalent to the grayscale information can be selected from the target parameter group as the target compensation parameter.

For Step S303: compensating the light emitting brightness of the sub-pixel according to the target compensation parameter.

It is understandable that in this embodiment, the target compensation parameter group is determined first through steps S1 to S3, and then to determine the target compensation parameter corresponding to the gray-scale information from the target compensation parameter groups according to the specific content of each sub-pixel in a frame corresponding to the gray-scale information, so that the light emitting brightness of the sub-pixels is compensated accordingly.

Figure 6:
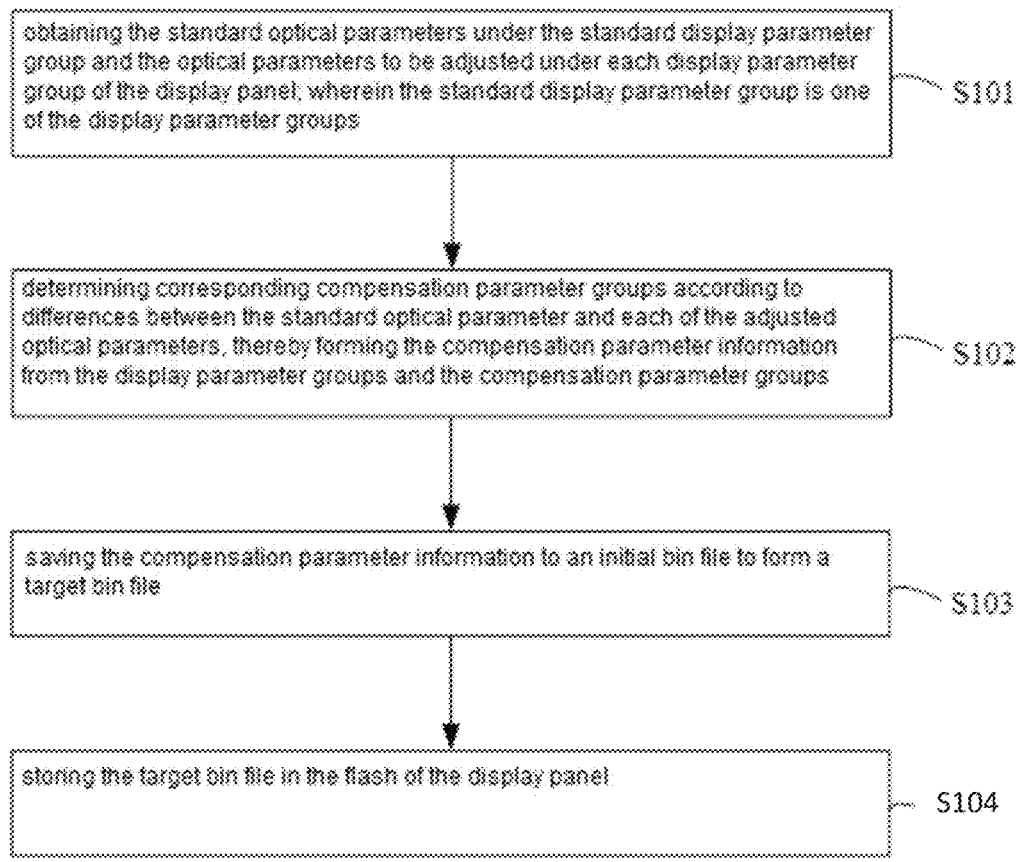
FIG. 6 is a flowchart of a fourth method for controlling a display panel according to an embodiment of the present application.

In an embodiment, as shown in FIG. 6, the step of obtaining compensation parameter information of the display panel includes but is not limited to the following steps.

For Step S101: obtaining the standard optical parameters under the standard display parameter group and the optical parameters to be adjusted under each display parameter group of the display panel; wherein the standard display parameter group is one of the display parameter groups.

Specifically, the optical parameters of the sub-pixels in the standard display parameter group are taken as the standard optical parameters; there is no restriction on the specific content of the standard display parameter group, and it only needs to meet the characteristics that the sub-pixels under the standard display parameter group are weaker than the sub-pixels under other display parameter groups. This weaker picture unevenness can be improved by improving the display unevenness of the picture caused by non-display information; that may also include, for example, the differences in the length of the lines in the display panel and the differences in individual devices.

Further, combined with the above discussion, compared with the DC dimming mode, the PWM dimming mode involves the duty cycle of voltage or current, therefore, the light emitting brightness of the sub-pixels in the PWM dimming mode has a larger difference compared with the sub-pixels that do not have this issue (for example, sub-pixels in DC dimming mode). Therefore, the standard display parameter set in this embodiment can be understood as corresponding to sub-pixels, wherein there is no unevenness in the picture due to voltage or current, for example, corresponding to the DC dimming mode; on the other hand, the optical parameters to be adjusted can be understood as corresponding to the sub-pixels that have unevenness in the picture due to voltage or current, for example, it corresponds to PWM dimming mode.

Wherein, the quantity and type of information contained in the standard display parameter group may be the same as the quantity and type of information contained in any display parameter group respectively to ensure that the factor determining the standard optical parameter is consistent with the factor determining any optical parameter to be adjusted.

Specifically, the standard optical parameters and any optical parameters to be adjusted can be obtained through the same optical device; similarly, the quantity and type of information contained in a standard optical parameter can be the same as the quantity and type of information contained in any optical parameter to be adjusted, so as to improve the reliability of the comparison between the two.

For the Step S102, determining corresponding compensation parameter groups according to differences between the standard optical parameter and each of the adjusted optical parameters, thereby forming the compensation parameter information from the display parameter groups and the compensation parameter groups.

It should be noted that there are no restrictions on the quantity and type of information contained in the standard optical parameters. Under a certain grayscale value and display parameter group, the "determining corresponding compensation parameter groups according to differences between the standard optical parameter and each of the adjusted optical parameters" could be understood as adjusting the voltage value, current value, voltage duty cycle, or current duty cycle of the sub-pixel corresponding to the optical parameter to be adjusted, and comparing the difference between the optical parameter to be adjusted and the standard optical parameter until the difference reach 0 or a preset range; and then obtaining the difference between the voltage value, current value, voltage duty ratio, or current duty of the sub-pixel relative to the adjustment at this time to determine the corresponding compensation parameter corresponding to the grayscale value and the display parameter group; obtaining multiple compensation parameters corresponding to multiple grayscale values under the display parameter group to form a compensation parameter group corresponding to the display parameter group. Also, other compensation parameter groups corresponding to other display parameter groups can also be obtained accordingly.

Furthermore, as shown in FIG. 6, after step S102, the following steps may be further includes Step S103: saving the compensation parameter information to an initial bin file to form a target bin file.

Specifically, it may include determining initial compensation information before step S101, the initial compensation information is used to compensate for the uneven display of the picture caused by other reasons in the display panel, and that is, the standard optical parameters under the standard display parameter group can still be displayed unevenly for other reasons. Wherein, other reasons can be understood as reasons that have nothing to do with the "multiple display parameter groups" in step S1, and the initial compensation information is formed as an initial bin file, and the compensation parameter information is added to the initial bin file to form a target bin file. Both the initial bin file and the target bin file are files in the bin format.

For Step S104: storing the target bin file in the flash of the display panel.

Specifically, in step S1, the compensation parameter information can be obtained from the flash of the display panel for subsequent operations. In an embodiment, the display panel includes a first display area and a second display area surrounding the first display area, and the sub-pixels in the first display area are electrically connected to the pixel driving circuit in the second display area. Wherein, the display panel comprises a first display area and a second display area surrounding the first display area, and a sub-pixel in the first display area electrically connects to a pixel driving circuit in the second display area; and wherein the step of obtaining a standard optical parameter of the standard display parameter group of the display panel and an adjusted optical parameter of each of the display parameter groups of the display panel further comprises: obtaining an optical parameter of the standard display parameter group of the second display area of the display panel as the standard optical parameter and an optical parameter of each of the display parameter groups of the first display area of the display panel as the adjusted optical parameter.

In combination with the above discussion, the first display area can be understood as having a greater need for light transmission than the second display area. The pixel driving circuit electrically connected to the sub-pixels of the first display area to drive the sub-pixels of the first display area may be set in the second display area that has a small light transmission requirement, so that the attenuation degree of the electrical signals transmitted to the plurality of sub-pixels in the first display area and the attenuation degree of the electrical signals transmitted to the multiple sub-pixels in the second display area are greatly different, as a result, a ring screen will appear in the area near the junction of the first display area and the second display area; moreover, since the distribution of the first display area is fixed, that is, the sub-pixels are more concentrated in the first display area, so that the "circular picture" is more obvious than the picture display unevenness caused by other reasons.

Wherein, in this embodiment, the sub-pixels corresponding to the standard optical parameters are located is limited, and the area where the sub-pixels corresponding to the display parameter group is located is limited; specifically, the standard optical parameters are determined from the second display area where the attenuation of the electrical signal is relatively small, and the optical parameters to be adjusted are determined from the first display area where the attenuation of the electrical signal is relatively large. It is understandable that the attenuated electrical signal of the second display area is closer to the original electrical signal than the first display area; in this embodiment, on the basis of the standard display parameter group, the optical parameters of the second display area that are closer to the original electrical signal are defined as the standard optical parameters, as the adjusted direction of the optical parameters to be adjusted, so that the obtained compensation parameter information finally makes the electric signal in the first display area approach the direction close to the original electric signal, and the reliability and accuracy of corresponding compensation for the light emitting brightness of the sub-pixels are further improved.

Figure 7:
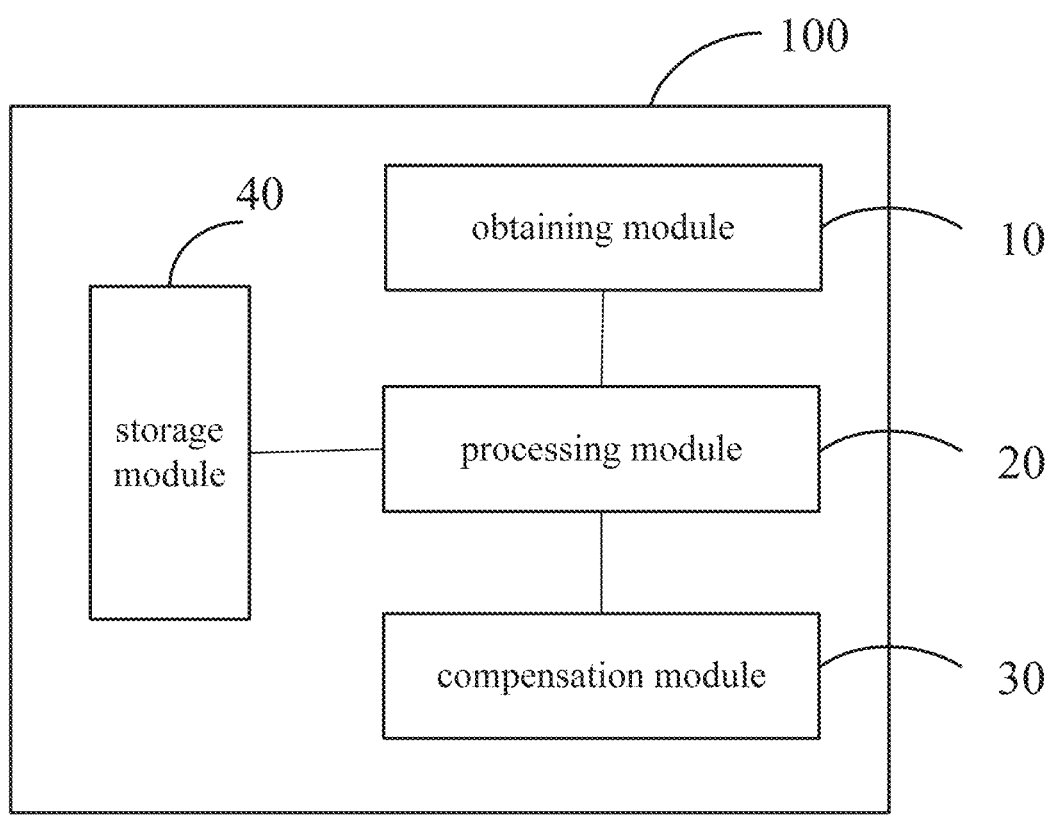
FIG. 7 is a structural block diagram of a display panel provided by an embodiment of the present application.

The present application provides a display panel, as shown in FIG. 7, the display panel 100 includes but is not limited to the following modules.

The obtaining module 10 is used to obtain display information and compensation parameter information of the display panel, wherein the compensation parameter information includes multiple display parameter groups and multiple compensation parameter groups in one-to-one correspondence, and the display information is one of the display parameter groups.

Specifically, the display panel may be an organic light-emitting diode (OLED) display panel or a liquid crystal display panel. Among them, the sub-pixels in the OLED display panel emit light under the drive of voltage or current through self-luminous devices. The light emitting brightness of a sub-pixel is related to the current or voltage flowing through the self-luminous device and the length of time the current or voltage acts on it. For example, in the DC dimming mode, to control the light emitting brightness of the sub-pixels, the current or voltage flowing through the self-luminous device is controlled in each frame, and the current or voltage in each frame is not zero. Another example is the Pulse Width Modulation (PWM) dimming mode, which controls the duty cycle or duty ratio (the length of time) of the current or voltage flowing through the self-luminous device in each frame and keeps the current or voltage equal in each frame to control the brightness of the sub-pixels. Wherein, the sub-pixels in the liquid crystal display panel emit light through the liquid crystal layer through the light from the backlight; the light transmittance of the liquid crystal layer is related to the voltage applied to both ends of the liquid crystal layer; the light of the backlight is related to the current or voltage flowing through the backlight and is related to the duration of the current or voltage. For backlight sources in different areas, the amount of light in each frame can be adjusted through the DC area backlight dimming mode or the PWM area backlight dimming mode. For the principle of the DC area backlight dimming mode, please refer to the relevant description of the DC dimming mode above; for the principle of the PWM area backlight dimming mode, please refer to the relevant description of the PWM dimming mode above; so that the light emitting brightness of sub-pixels in a liquid crystal display panel is related to the voltage applied to both ends of the liquid crystal layer, the current or voltage flowing through the backlight, and the duration of the current or voltage.

Specifically, the compensation parameter information in this embodiment includes multiple display parameter groups and multiple compensation parameter groups in one-to-one correspondence; that it, this embodiment arranges a corresponding compensation parameter group for each display parameter group, the display information is one of multiple display parameter groups, and at least one compensation parameter group corresponds to the display parameter group of the display panel. In combination with the above discussion, the display parameter group may be related to the dimming mode of the display panel or the dimming mode of the display backlight. It should be noted that the specific content of the display parameter group is not limited in this embodiment; this embodiment emphasizes that multiple compensation parameter groups, including but not limited to, can be implemented based on the difference between the dimming mode of the display panel and the dimming mode of the area backlight, rather than based on only a single compensation parameter group to compensate the light emitting brightness of the display panel.

Wherein, combined with the above discussion, the compensation parameter information can be saved as a bin format file to be stored in the flash of the display panel for accessing by the acquisition module 10.

A processing module 20 is configured to determine a target compensation parameter group corresponding to the display information from the compensation parameter groups according to the display information and the compensation parameter information Specifically, combined with the above discussion, the display information is one of said display parameter groups, that is, the processing module 20 may determine the display parameter group that is the same as the display information, and then determine the compensation parameter group corresponding to the display parameter group as the target compensation parameter group. It is understandable that the processing module 20 in this embodiment can select the corresponding compensation parameter group as the target compensation parameter group according to the displayed information, that is, the display panel selects two different compensation parameter groups in two states with different display information, or in two states corresponding to two different display parameter groups in the compensation parameter information, instead of assigning a fixed compensation parameter group to all display information.

The compensation module 30 is configured to compensate the light emitting brightness of the display panel according to the target compensation parameter group.

Specifically, combined with the above discussion, the compensation parameter information in this embodiment includes multiple display parameter groups and multiple compensation parameter groups; the display parameter groups and compensation parameter groups are in one-to-one correspondence; the display information is one of multiple display parameter groups; and the target compensation parameter group is a compensation parameter group selected according to the specific content of the displayed information. It is understandable that the target compensation parameter group in this embodiment is the compensation parameter group corresponding to the display information in the compensation parameter information; that is, the target compensation parameter group is dynamically determined for the specific content of the displayed information, rather than to compensate all the display information of the display panel by a fixed set of compensation parameters. Regarding the technical problem that a set of compensation values cannot be applied to the PWM dimming mode and the DC dimming mode at the same time, the PWM dimming mode and the DC dimming mode can be understood as two different display parameter groups in this embodiment; that is, in this embodiment, two corresponding compensation parameter groups are respectively set for the PWM dimming mode and the DC dimming mode to be respectively applied to the PWM dimming mode and the DC dimming mode, so as to reduce the uneven risk of the display picture.

Wherein, the display information can be the display information of the picture to be displayed in the display panel; that is, the processing module 20 of this embodiment can be used to determine the target compensation parameter group, and the compensation module 30 can be used to compensate the display brightness of the picture to be displayed in the display panel; so as to improve the uneven display of the exposed screen in this embodiment when displaying the screen to be displayed. Moreover, the display information may also be the display information of the currently displayed screen in the display panel; that is, when the currently displayed screen is being displayed, the compensation module 30 in this embodiment can improve the unevenness of the screen display in real time. Wherein, in combination with the above discussion, the target compensation parameter group may include the corresponding voltage value, current value, voltage duty cycle, and current duty cycle that act on the corresponding sub-pixel.

The storage module 40 is used to store the target compensation parameter group. Specifically, the storage module 40 may electrically connect to the processing module 20 to obtain and store the target compensation parameter group; the compensation module 30 may electrically connect to the processing module 20 or the storage module 40 to obtain the target compensation parameter group.

In an embodiment, each of the display parameter groups includes a first display parameter, at least one display mode parameter group further includes a second display parameter; and the processing module 20 includes a sub-obtaining module, a first sub-processing module, a second sub-processing module, and a third sub-processing module. The sub-obtaining module is configured to obtain the first display information and the second display information of the display information, wherein the first display information is one of the first display parameters, and the second display information is one of at least one the second display parameter.

Specifically, according to the above discussion, each display parameter group includes at least the first display parameter, and part of the display parameter group may also include the second display parameter; correspondingly, the display information also includes at least the first display information, and the first display information is the same as one of first display parameters of the display parameter groups with one-to-one correspondence. Furthermore, according to the above discussion, on the basis that each display parameter group includes at least the first display parameter, the at least one display mode parameter group further includes a second display parameter; correspondingly, the at least one display information includes first display information and second display information, and the second display information is the same as one of the multiple second display parameters; the display information includes the first display information and the second display information as an example for below description.

The first sub-processing module is configured to determine at least one first-type display parameter group corresponding to the first display information from the display parameter groups according to the first display information and the first display parameters, wherein at least one the first-type display parameter group comprises the second display parameter;

Specifically, according to the discussion above, in the compensation parameter information, the multiple display parameter groups and multiple compensation parameter groups are in one-to-one correspondence, and the first display information is one of the first display parameters; that is, all the display parameter groups with the same first display parameter and the first display information could be selected as the at least one first-type display parameter group by the first sub-processing module; in other words, the common ground of the at least one first-type display parameter group is that the first display parameter in each first-type display parameter group is the same as the first display information. Furthermore, at least one display the first-type display parameter group includes a second display parameter as an example for below description.

It should be noted that when the display information includes the first display information and the second display information, the first display information and the second display information could be obtained by sub-obtaining module at the same time, and then at least one the first-type display parameter group corresponding to the first display information could be determined from the multiple display parameter groups by the first sub-processing module. Of course, it is also possible to determine at least one the first-type display parameter group corresponding to the first display information from display parameter groups by the first sub-processing module and then to obtain the second display information by the sub-obtaining module.

The second sub-processing module is configured to determine a target display parameter group corresponding to the second display information from at least one the first-type display parameter group according to the second display information and at least one the second display parameter.

Specifically, according to the above discussion, at least one the first-type display parameter group can be determined through the first sub-processing module, and the at least one display mode parameter group also includes a second display parameter. Furthermore, in all the first-type display parameter groups, at least one second display parameter is the same as the second display information; that is, the second sub-processing module may select at least one the first-type display parameter group whose second display parameter is the same as the second display information as the target display parameter group.

It should be noted that when at least one first type display parameter group includes the second display parameter, the first display information and the second display information can be acquired first, and then the first type display parameter group and the target display parameter group can be acquired in sequence; for example, step S201 to step S203. Of course, the first sub-processing module may also determine at least one first type display parameter group corresponding to the first display information from the plurality of display parameter groups, and the sub-acquisition module may then obtain the second display information for the second sub-processing module to further determine the target display parameter group corresponding to the second display information.

The third sub-processing module is configured to determine the target compensation parameter group corresponding to the target display parameter group from the compensation parameter groups according to the target display parameter group and the compensation parameter information.

Specifically, according to the above discussion, the first display parameter in the target display parameter group is the first display information, and the second display parameter in the target display parameter group is the second display information; that is, the target display parameter group is determined according to the two levels of screening of the first display information and the second display information; so that, after at least one the first-type display parameter group is determined by third first-processing module, the target display parameter group is further determined according to the second display information by the second sub-processing module; specifically determining a first-type display parameter group that is the same as the second display information is from at least one the first-type display parameter group with a second display parameter as the target display parameter group by comparing each second display parameter with the second display information by the second sub-processing module; moreover, since each display parameter group has a corresponding compensation parameter group, the target compensation parameter group can also be determined as the compensation parameter group corresponding to the target display parameter group correspondingly.

It is understandable that in this embodiment, for the first-type display parameter group that conforms to the first display information, the second display information is further screened to determine the target compensation parameter group for compensating the light emitting brightness of the display panel; that is, based on the target compensation parameter group for the display screen that meets the first display information, the third sub-processing module can focus on more accurate compensation for the display screen that also meets the second display information, so as to improve the accuracy of compensating the light emitting brightness of the display panel.

The present application provides a display panel and a control method thereof. The control method comprises obtaining display information and compensation parameter information of the display panel, wherein the compensation parameter information includes multiple display parameter groups and multiple compensation parameter groups which are in one-to-one correspondence, and the display information is one of the display parameter groups; determining a target compensation parameter group corresponding to the display information from the compensation parameter groups according to the display information and the compensation parameter information; and compensating the light emitting brightness of the display panel according to the target compensation parameter group. Wherein, each display parameter group in the present application has a corresponding compensation parameter group, and the target compensation parameter group dynamically determines the compensation parameters according to the displayed information to compensate the light emitting brightness of the display panel, rather than a fixed compensation parameter group, so as to improve the reliability and accuracy of compensation and to reduce the uneven risk of the display screen.

The display panel and its control method provided by the embodiments of the present application are described in detail above. Specific examples are used in this article to illustrate the principle and implementation of the present application. The description of the above embodiments is only used to help understand the technical solution of the present application and its core idea. Those of ordinary skill in the art should understand that: they can still modify the technical solutions recorded in the foregoing embodiments, or equivalently replace some of the technical features. However, these modifications or replacements do not cause the essence of the corresponding technical solutions to deviate from the scope of the technical solutions of the embodiments of the present application.

What is claimed is:

1. A control method of a display panel, comprising following steps:

obtaining display information and compensation parameter information of the display panel, wherein the compensation parameter information includes multiple display parameter groups and multiple compensation parameter groups which are in one-to-one correspondence, and the display information is one of the display parameter groups;

determining a target compensation parameter group corresponding to the display information from the compensation parameter groups according to the display information and the compensation parameter information; and compensating the light emitting brightness of the display panel according to the target compensation parameter group;

wherein each of the display parameter groups comprises a first display parameter, and at least one display-mode parameter group comprises a second display parameter;

wherein, the step of determining a target compensation parameter group corresponding to the display information from the compensation parameter groups according to the display information and the compensation parameter information further comprises following steps:

obtaining first display information and second display information of the display information, wherein the first display information is one of the first display parameters, and the second display information is one of at least one the second display parameter;

determining at least one first-type display parameter group corresponding to the first display information from the display parameter groups according to the first display information and the first display parameters, wherein at least one the first-type display parameter group comprises the second display parameter;

determining a target display parameter group corresponding to the second display information from at least one the first-type display parameter group according to the second display information and at least one the second display parameter;

determining the target compensation parameter group corresponding to the target display parameter group from the compensation parameter groups according to the target display parameter group and the compensation parameter information;

wherein the step of obtaining compensation parameter information of the display panel further comprises following steps:

obtaining a standard optical parameter of the standard display parameter group of the display panel and an adjusted optical parameter of each of the display parameter groups of the display panel, wherein the standard display parameter group is one of the display parameter groups; and determining corresponding compensation parameter groups according to differences between the standard optical parameter and each of the adjusted optical parameters, thereby forming the compensation parameter information from the display parameter groups and the compensation parameter groups.

2. The control method of a display panel according to claim 1, wherein all or part of the first display parameters are dimming mode parameters, the first display information is a pulse width modulation (PWM) dimming mode, and the second display parameter comprises at least one of a display frequency parameter or a display brightness parameter.

3. The control method of a display panel according to claim 2, wherein the second display parameter comprises a display frequency parameter and a display brightness parameter, and the second display information comprises display frequency information and display brightness information; and wherein the step of determining a target display parameter group corresponding to the second display information from at least one the first-type display parameter group comprises:

determining the target display parameter group corresponding to the second display information from at least one the first-type display parameter group according to the display frequency information, the display brightness information, the display frequency parameter of at least one the second display parameter, and the display brightness parameter of at least one the second display parameter.

4. The control method of a display panel according to claim 1, wherein the display panel comprises a first display area and a second display area surrounding the first display area, and a sub-pixel in the first display area electrically connects to a pixel driving circuit in the second display area;

wherein the step of obtaining display information of the display panel further comprises following steps:

obtaining display information of the first display area of the display panel; and wherein the step of compensating the light emitting brightness of the display panel according to the target compensation parameter group comprises:

compensating the light emitting brightness of the first display area of the display panel according to the target compensation parameter group.

5. The control method of a display panel according to claim 1, wherein the display panel comprises a first display area and a second display area surrounding the first display area, and a sub-pixel in the first display area electrically connects to a pixel driving circuit in the second display area; and wherein the step of obtaining a standard optical parameter of the standard display parameter group of the display panel and an adjusted optical parameter of each of the display parameter groups of the display panel further comprises following steps:

obtaining an optical parameter of the standard display parameter group of the second display area of the display panel as the standard optical parameter and obtaining an optical parameter of each of the display parameter groups of the first display area of the display panel as the adjusted optical parameter.

6. The control method of a display panel according to claim 1, wherein each of the compensation parameter groups comprises multiple grayscale parameters and multiple compensation parameters which are in one-to-one correspondence;

wherein the step of compensating the light emitting brightness of the display panel according to the target compensation parameter group comprises following steps:

obtaining grayscale information of sub-pixels of the display panel, wherein the grayscale information is one of grayscale parameters;

determining the target compensation parameter corresponding to the grayscale information from the target compensation parameter group according to the grayscale information and the target compensation parameter group; and compensating the light emitting brightness of the sub-pixel according to the target compensation parameter.

7. A control method of a display panel, comprising following steps:

obtaining display information and compensation parameter information of the display panel, wherein the compensation parameter information includes multiple display parameter groups and multiple compensation parameter groups which are in one-to-one correspondence, and the display information is one of the display parameter groups;

determining a target compensation parameter group corresponding to the display information from the compensation parameter groups according to the display information and the compensation parameter information; and compensating the light emitting brightness of the display panel according to the target compensation parameter group;

wherein each of the display parameter groups comprises a first display parameter, and at least one display-mode parameter group comprises a second display parameter; and wherein, the step of determining a target compensation parameter group corresponding to the display information from the compensation parameter groups according to the display information and the compensation parameter information further comprises:

obtaining first display information and second display information of the display information, wherein the first display information is one of the first display parameters, and the second display information is one of at least one the second display parameter;

determining at least one first-type display parameter group corresponding to the first display information from the display parameter groups according to the first display information and the first display parameters, wherein at least one the first-type display parameter group comprises the second display parameter;

determining a target display parameter group corresponding to the second display information from at least one the first-type display parameter group according to the second display information and at least one the second display parameter; and determining the target compensation parameter group corresponding to the target display parameter group from the compensation parameter groups according to the target display parameter group and the compensation parameter information.

8. The control method of a display panel according to claim 7, wherein all or part of the first display parameters are dimming mode parameters, the first display information is a pulse width modulation (PWM) dimming mode, and the second display parameter comprises at least one of a display frequency parameter or a display brightness parameter.

9. The control method of a display panel according to claim 8, wherein the second display parameter comprises a display frequency parameter and a display brightness parameter, and the second display information comprises display frequency information and display brightness information; and
wherein the step of determining a target display parameter group corresponding to the second display information from at least one the first-type display parameter group comprises:
determining the target display parameter group corresponding to the second display information from at least one the first-type display parameter group according to the display frequency information, the display brightness information, the display frequency parameter of at least one the second display parameter, and the display brightness parameter of at least one the second display parameter.

10. The control method of a display panel according to claim 7, wherein the display panel comprises a first display area and a second display area surrounding the first display area, and a sub-pixel in the first display area electrically connects to a pixel driving circuit in the second display area;
wherein the step of obtaining display information of the display panel further comprises:
obtaining display information of the first display area of the display panel; and
wherein the step of compensating the light emitting brightness of the display panel according to the target compensation parameter group comprises:
compensating the light emitting brightness of the first display area of the display panel according to the target compensation parameter group.

11. The control method of a display panel according to claim 7, wherein the step of obtaining compensation parameter information of the display panel further comprises:
obtaining a standard optical parameter of the standard display parameter group of the display panel and an adjusted optical parameter of each of the display parameter groups of the display panel, wherein the standard display parameter group is one of the display parameter groups; and
determining corresponding compensation parameter groups according to differences between the standard optical parameter and each of the adjusted optical parameters, thereby forming the compensation parameter information from the display parameter groups and the compensation parameter groups.

12. The control method of a display panel according to claim 11, wherein the display panel comprises a first display area and a second display area surrounding the first display area, and a sub-pixel in the first display area electrically connects to a pixel driving circuit in the second display area; and
wherein the step of obtaining a standard optical parameter of the standard display parameter group of the display panel and an adjusted optical parameter of each of the display parameter groups of the display panel further comprises:
obtaining an optical parameter of the standard display parameter group of the second display area of the display panel as the standard optical parameter and an optical parameter of each of the display parameter groups of the first display area of the display panel as the adjusted optical parameter.

13. The control method of a display panel according to claim 7, wherein each of the compensation parameter groups comprises multiple grayscale parameters and multiple compensation parameters which are in one-to-one correspondence;
wherein the step of compensating the light emitting brightness of the display panel according to the target compensation parameter group comprises:
obtaining grayscale information of sub-pixels of the display panel, wherein the grayscale information is one of grayscale parameters;
determining the target compensation parameter corresponding to the grayscale information from the target compensation parameter group according to the grayscale information and the target compensation parameter group; and
compensating the light emitting brightness of the sub-pixel according to the target compensation parameter.

14. A display panel:
configured to obtain display information and compensation parameter information of the display panel, wherein the compensation parameter information comprises multiple display parameter groups and multiple compensation parameter groups which are in one-to-one correspondence, and the display information is one of the display parameter groups;
configured to determine a target compensation parameter group corresponding to the display information from the compensation parameter groups according to the display information and the compensation parameter information;
configured to compensate the light emitting brightness of the display panel according to the target compensation parameter group; and
configured to store the target compensation parameter group;
wherein each of the display parameter groups comprises a first display parameter, and at least one the display mode parameter group comprises a second display parameter;
wherein the display is further configured to obtain the first display information and the second display information of the display information, wherein the first display information is one of the first display parameters, and the second display information is one of at least one the second display parameter;
the display is further configured to determine at least one first-type display parameter group corresponding to the first display information from the display parameter groups according to the first display information and the first display parameters, wherein at least one the first-type display parameter group comprises the second display parameter;
the display is further configured to determine a target display parameter group corresponding to the second display information from at least one the first-type display parameter group according to the second display information and at least one the second display parameter; and
the display is further configured to determine the target compensation parameter group corresponding to the target display parameter group from the compensation parameter groups according to the target display parameter group and the compensation parameter information.

15. The display panel according to claim 14, wherein the display panel comprises a first display area and a second display area surrounding the first display area, and a sub-pixel in the first display area electrically connects to a pixel driving circuit in the second display area;

the display is configured to obtain the display information of the first display area of the display panel; and the display is configured to compensate the light emitting brightness of the first display area according to the target compensation parameter group.

16. The display panel according to claim 14, wherein the step of obtaining compensation parameter information of the display panel further comprises:

obtaining a standard optical parameter of the standard display parameter group of the display panel and an adjusted optical parameter of each of the display parameter groups of the display panel, wherein the standard display parameter group is one of the display parameter groups; and determining corresponding compensation parameter groups according to differences between the standard optical parameter and each of the adjusted optical parameters, thereby forming the compensation parameter information from the display parameter groups and the compensation parameter groups.

17. The display panel according to claim 16, wherein the display panel comprises a first display area and a second display area surrounding the first display area, and a sub-pixel in the first display area electrically connects to a pixel driving circuit in the second display area; and wherein the display is configured to obtain the optical parameters of the standard display parameter group of the second display area of the display panel as the standard optical parameters and configured to obtain the optical parameter of each the display parameter group of the first display area in the display panel as an adjusted optical parameter.

18. The display panel according to claim 14, wherein each of the compensation parameter groups comprises multiple grayscale parameters and multiple compensation parameters which are in one-to-one correspondence;

wherein the display is configured to obtain grayscale information of the sub-pixels of the display panel, is configured to determine a target compensation parameter corresponding to the grayscale information from the target compensation parameter group according to the grayscale information and the target compensation parameter group; and is configured to compensate the light emitting brightness of the sub-pixel according to the target compensation parameter; and wherein the grayscale information is one of grayscale parameters.

\* \* \* \* \*